United States Patent
Lee

(10) Patent No.: US 11,505,154 B2
(45) Date of Patent: Nov. 22, 2022

(54) VEHICULAR SEAT CUSHION AIRBAG

(71) Applicant: HYUNDAI MOBIS CO., LTD., Seoul (KR)

(72) Inventor: Kyu Sang Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/135,193

(22) Filed: Dec. 28, 2020

(65) Prior Publication Data

US 2021/0221316 A1 Jul. 22, 2021

(30) Foreign Application Priority Data

Jan. 16, 2020 (KR) .......................... 10-2020-0006142

(51) Int. Cl.
| | |
|---|---|
| *B60R 21/207* | (2006.01) |
| *B60R 21/231* | (2011.01) |
| *B60R 21/276* | (2006.01) |
| *B60R 21/0136* | (2006.01) |
| *B60R 21/233* | (2006.01) |
| *B60R 21/00* | (2006.01) |

(52) U.S. Cl.
CPC ........ *B60R 21/207* (2013.01); *B60R 21/0136* (2013.01); *B60R 21/233* (2013.01); *B60R 21/23138* (2013.01); *B60R 21/276* (2013.01); *B60R 2021/0004* (2013.01); *B60R 2021/0006* (2013.01); *B60R 2021/0011* (2013.01); *B60R 2021/0053* (2013.01); *B60R 2021/0055* (2013.01); *B60R 2021/23107* (2013.01); *B60R 2021/23146* (2013.01); *B60R 2021/23324* (2013.01)

(58) Field of Classification Search
CPC ............ B60R 21/207; B60R 21/23138; B60R 21/276; B60N 2/24763
See application file for complete search history.

(56) References Cited

U.S. PATENT DOCUMENTS

| | | | |
|---|---|---|---|
| 11,117,539 B2 * | 9/2021 | Masuda | B60N 3/066 |
| 2020/0189513 A1 * | 6/2020 | Volkmann | B60R 21/207 |
| 2021/0122325 A1 * | 4/2021 | Hwangbo | B60R 21/26 |
| 2021/0221315 A1 * | 7/2021 | Deng | B60N 2/68 |

FOREIGN PATENT DOCUMENTS

| | | | | |
|---|---|---|---|---|
| EP | 3643566 A1 * | 4/2020 | ........... | B60R 21/207 |
| GB | 2299061 A * | 9/1996 | ....... | B60R 21/23138 |
| KR | 10-2004-0024278 A | 3/2004 | | |
| KR | 20200141727 A * | 12/2020 | ........... | B60R 21/207 |

* cited by examiner

*Primary Examiner* — Faye M Fleming
(74) *Attorney, Agent, or Firm* — DLA Piper LLP (US)

(57) ABSTRACT

A vehicular seat cushion airbag is disclosed. The seat cushion airbag includes a first cushion, which is mounted on a seat cushion of a vehicle so as to be expanded at the rear portion of a passenger's thigh, and a second cushion, which extends from the first cushion in an upward direction of a bolster portion of the seat cushion so as to be expanded toward the lateral side surface of the passenger's thigh, wherein the first cushion is expanded at the rear portion of the passenger's thigh so as to prevent forward movement of the passenger's pelvis, and the second cushion is expanded toward the lateral side surface of the passenger's thigh so as to prevent outward spreading of the passenger's legs.

10 Claims, 7 Drawing Sheets

2
VEHICULAR SEAT CUSHION AIRBAG

CROSS-REFERENCE TO RELATED APPLICATION

This application claims the priority benefit of Korean Patent Application No. 10-2020-0006142, filed on Jan. 16, 2020 in the Korean Intellectual Property Office, the disclosure of which is incorporated herein by reference.

BACKGROUND OF THE INVENTION

1. Field of the Invention

The present invention relates to a vehicular seat cushion airbag, and more particularly to a vehicular seat cushion airbag, which is expanded at a seat cushion of a vehicle so as to protect a passenger's lower body.

2. Description of the Related Art

In recent years, it is anticipated that the configuration of internal space in vehicles will greatly change with the advent of autonomous vehicles. With the realization of autonomous traveling in the state in which a passenger occupies in the internal space of a vehicle, the component that is anticipated to be most greatly changed is the seat of the vehicle, among the various components of the vehicle.

A conventional seat has been constructed so as to allow only a small change in height or the like in the state of being oriented to face in the forward direction of the vehicle. With realization of autonomous travel, a driver is freed from the need to drive. Hence, since a front seat is allowed to be converted into a backward-facing orientation, it is possible to take an orientation in which a front passenger faces a rear passenger, and it is possible to enlarge the space occupied by the passenger's legs.

Accordingly, in the event of a collision involving an autonomous vehicle, the passenger's thighs may be spread outwards and may thus collide with an interior part of the vehicle, thereby causing injury to the thighs, because the space occupied the passenger's thighs is enlarged. Furthermore, the passenger's pelvis may be moved in the forward direction of the seat cushion while the passenger's thighs are spread outwards, thereby causing a submarine phenomenon in which the passenger's abdominal region is pressed by a safety belt, which is problematic.

Accordingly, there is a need to provide a technology for protecting a passenger's legs in the event of a collision involving an autonomous vehicle.

Details described as the background art are intended merely for the purpose of promoting understanding of the background of the present invention, and should not be construed as an acknowledgment of the prior art that is previously known to those of ordinary skill in the art.

SUMMARY OF THE INVENTION

Therefore, the present invention has been made in view of the above problems, and it is an object of the present invention to provide an airbag mounted on a seat cushion of a vehicle, which is applicable to an autonomous vehicle and which is capable of protecting a passenger's lower body and of preventing injury to a passenger's thigh caused by outward spreading of the passenger's thigh in the event of a collision involving the vehicle.

In accordance with the present invention, the above and other objects can be accomplished by the provision of a vehicular seat cushion airbag including a first cushion mounted on a seat cushion of a vehicle so as to be expanded upwards, a second cushion, which is positioned at an outer side of the first cushion and is expanded in an upward direction of the first cushion, and a first inflator, which is mounted on the seat cushion and generates airbag gas to be supplied to an inside of the first or second cushion.

The vehicular seat cushion airbag may further include a separator, which is disposed between the first and second cushions and includes at least one vent hole, wherein the first and second cushion communicate with each other through the plurality of vent holes, and the airbag gas flows from one of the first and second cushions to the other of the first and second cushions through the plurality of vent holes.

The first inflator may be connected to the first cushion such that the first cushion is first expanded at the time of explosion of the first inflator and the airbag gas then flows to the second cushion from the first cushion through the plurality of vent holes so as to expand the second cushion.

The first inflator may be connected to the second cushion such that the second cushion is first expanded at the time of explosion of the first inflator and the airbag gas then flows to the first cushion from the second cushion through the plurality of vent holes so as to expand the first cushion.

The first cushion may be expanded upwards from the seat cushion so as to prevent forward movement of a passenger's pelvis.

The second cushion may be expanded toward a lateral side surface of a passenger's thigh so as to support the lateral side surface of the passenger's thigh.

Each of the first and second cushions may be composed of a pair of cushions, which are symmetrically mounted on two lateral sides of the seat cushion so as to be expanded toward two lateral side surfaces of the passenger's thighs.

The first and second cushions may be expanded so as to surround a passenger's thigh, thereby protecting the passenger's thigh in the event of a lateral collision involving the vehicle.

The vehicular seat cushion airbag may further include a second inflator, which is mounted on the seat cushion and generates airbag gas at the time of explosion thereof, wherein the first inflator is connected to the first cushion and the second inflator is connected to the second cushion.

The vehicular seat cushion airbag may further include a controller adapted to perform control of explosion of the first and second inflators, and the controller may perform control to explode the first inflator when a front collision signal or a rear collision signal is input from a collision sensor.

The vehicular seat cushion airbag may further include a controller adapted to perform control of explosion of the first and second inflators, and the controller may perform control to explode the second inflator when a lateral collision signal is input from a collision sensor.

The first and second cushions may be expanded at a stitch line of the seat cushion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
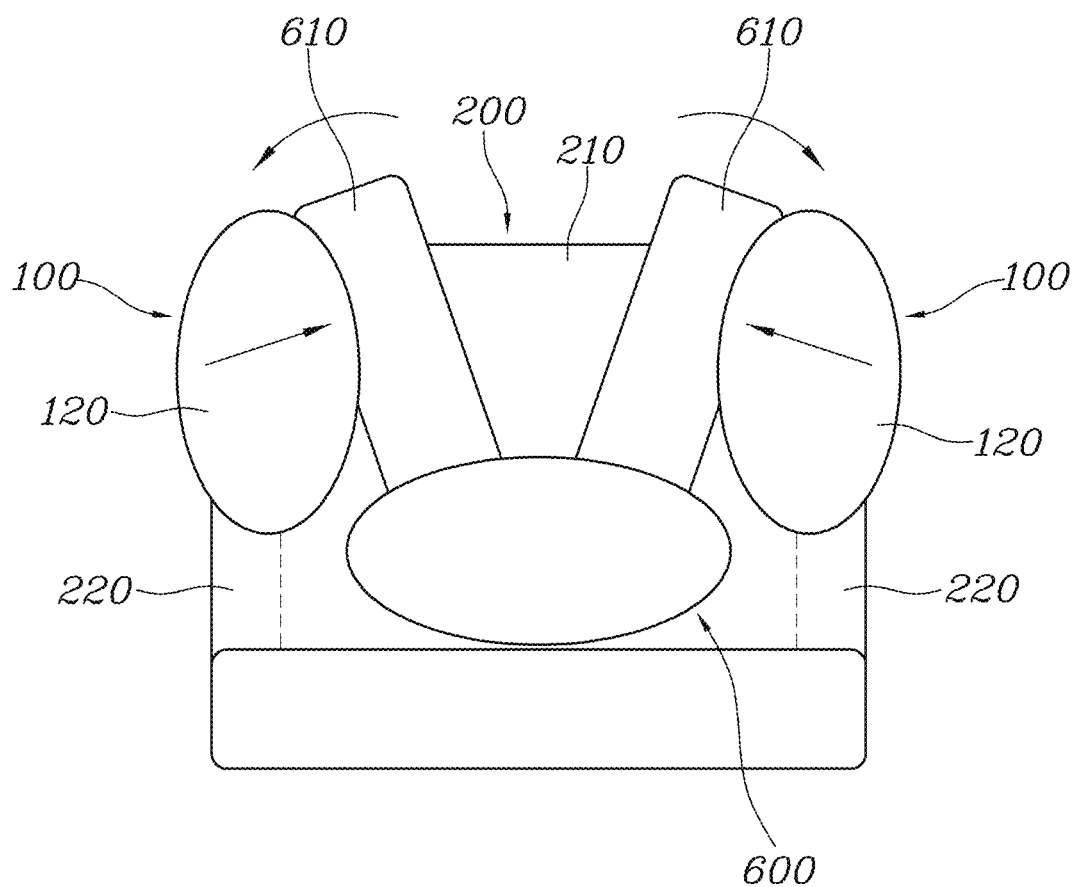
FIG. 1 is a plan view of a vehicular seat cushion airbag according to an embodiment of the present invention.

Specific structural and functional descriptions of embodiments of the present invention disclosed herein are only for purposes of illustration of the embodiments of the present invention. The present invention may be embodied in many different forms without departing from the spirit and significant characteristics of the present invention. Therefore, the embodiments of the present invention are disclosed only for illustrative purposes, and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be understood in the same way. The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Hereinafter, exemplary embodiments of the present invention will be described in detail with reference to the accompanying drawings. Throughout the drawings, the same reference numerals will refer to the same or like parts.

As illustrated in FIGS. 1 to 8, a vehicular seat cushion airbag 100 according to an embodiment of the present invention may include a pair of seat cushion airbags 100, which are symmetrically mounted on right and left sides of a seat cushion 200. The vehicular seat cushion airbag 100 may be filled and expanded with gas, which is generated by explosion of an inflator 130 mounted on the seat cushion 200 in the event of a collision involving the vehicle.

The vehicular seat may be composed of the seat cushion 200, a seat back on which a passenger leans, and a headrest (not shown) on which a passenger's head is rested. The vehicular seat cushion airbag 100 according to the embodiment of the present invention may be mounted on the seat cushion 200, among the components of the seat, and may be expanded.

The vehicular seat cushion airbag 100 according to the embodiment of the present invention may include a first cushion 110 and a second cushion 120. The vehicular seat cushion airbag 100 may further include an inflator 130, adapted to inject gas the first cushion 110 and the second cushion 120 in order to expand the first and second cushions 110 and 120, a seat sensor 300, adapted to detect seating of a passenger 600 on the seat, a plurality of collision sensors 400, adapted to detect collision involving the vehicle, and a controller 500 adapted to receive signals from the seat sensor 300 and the collision sensor 400 so as to control the inflator 130.

Specifically, the vehicular seat cushion airbag 100 according to the embodiment of the present invention may include the first cushion 110, which is mounted on the seat cushion 200 of the vehicle so as to be expanded upwards, the second cushion 120, which is positioned at the outer side of the first cushion 110 and extends upwards, and the inflator 130, which is mounted on the seat cushion 200 and generates gas to be supplied to the inside of the first cushion 110 or the second cushion 120.

The first cushion 110 and the second cushion 120 may be expanded so as to surround bottom and side surfaces of the thigh of the passenger 600. Consequently, it is possible to protect the lower body of the passenger 600 including the pelvis 620, the thigh 610, the knee and the like from the impact generated in a collision.

The first cushion 110 may expand upwards from the seat cushion so as to prevent forward movement of the pelvis 620 of the passenger 600, and the second cushion 120 may expand outwards from the thigh 610 of the passenger 600 so as to support the outer side of the thigh 610 of the passenger 600.

In the event of a collision involving the vehicle, the legs of the passenger 600 may spread outwards and may then collide with interior components (a console box, an armrest or the like) of the vehicle, legs of passengers 600 sitting on seats that face each other in an autonomous vehicle may collide with each other, or the lower body of the passenger may slide under a safety belt and the abdominal region of the passenger may be pressed by the safety belt due to a submarine phenomenon in which the thighs 610 of the passenger 600 are spread and the pelvis of the passenger 600 moves forwards, thereby causing enterorrhexis and thus death of the passenger 600.

In order to prevent these risks, the first cushion 110 may be mounted on the seat cushion 200, and may expand at the rear portion of the thigh 610 of the passenger 600. Consequently, the thigh 610 of the passenger 600 is raised, thereby preventing the pelvis 620 of the passenger 600 from being moved forwards.

Furthermore, since the second cushion 120 extends upwards from the first cushion 110 so as to expand at the outer side of the thigh 610 of the passenger 600 and thus to prevent the legs of the passenger 600 from spreading outwards, there is an effect of preventing injury to the passenger caused by collision of the thigh 610 of the passenger 600 with an interior component or collision of legs of passengers 600 in a vehicle in which the passengers sit on seats so as to face each other.

In addition, since outward spreading of the thighs 610 of the passenger 600 is prevented, it is possible to prevent a submarine phenomenon by preventing the thighs 610 from spreading outwards and the pelvis 620 from moving forwards.

The inflator 130 may supply airbag gas to one of the first cushion 110 and the second cushion 120, and the first cushion 110 and the second cushion 120 may communicate with each other such that the first cushion 110 and the second cushion 120 are simultaneously expanded by the supply of the airbag gas from the inflator 130.

The inflator 130 may be mounted on the seat cushion 200 together with the first cushion 110 and the second cushion 120. In the event of a collision involving the vehicle, the inflator 130 may explode to thereby supply gas to the first cushion 110 or the second cushion 120. At this time, since the first cushion 110 and the second cushion 120 communicate with each other, the gas injected into the first cushion 110 or the second cushion 120 may be transferred to the second cushion 120 or the first cushion 110 so as to expand the second cushion 120 or the first cushion 110. Furthermore, since the first cushion 110 and the second cushion 120 communicate with each other, it is possible to expand both the first cushion 110 and the second cushion 120 using a single inflator 130.

Accordingly, one of the first cushion 110 and the second cushion 120 may be expanded first, and the other of the first cushion 110 and the second cushion 120 may then expand.

When the first cushion 110 is connected to the inflator 130, the first cushion 110 is expanded first, and the second cushion 120 is then expanded, with the result that the first cushion 110 first prevents forward movement of the pelvis 620 of the passenger 600 and the second cushion 120 then prevents outward spreading of the legs of the passenger 600. Meanwhile, when the second cushion 120 is connected to the inflator 130, the second cushion 120 is first expanded, and the first cushion 110 is then expanded, with the result that the second cushion 120 first prevents outward spreading of the legs of the passenger 600, and the first cushion 110 then prevents forward movement of the pelvis 620 of the passenger 600.

The vehicular seat cushion airbag 100 according to the embodiment of the present invention may further include a separator 140, which is disposed between the first cushion 110 and the second cushion 120 and includes at least one vent hole 141. Accordingly, the airbag gas may flow from one of the first cushion 110 and the second cushion 120 to the other of the first cushion 110 and the second cushion 120 through the vent holes 141, thereby causing the first cushion 110 and the second cushion 120 to sequentially expand.

In other words, since the separator 140 having the vent holes 141 is provided between the first cushion 110 and the second cushion 120, when the airbag gas is injected into one of the first cushion 110 and the second cushion 120, the airbag gas is transferred to the other of the first cushion 110 and the second cushion 120 through the vent holes 141, with the result that the first cushion 110 and the second cushion 120 expand sequentially, thereby protecting the passenger 600.

Furthermore, it is possible to control the speed with which the first cushion 110 and the second cushion 120 are sequentially expanded by adjusting the size or number of vent holes 141.

When the inflator 130 is connected to the first cushion 110, it is possible to prevent forward movement of the pelvis 620 of the passenger 600 first. Meanwhile, when the inflator 130 is connected to the second cushion 120, it is possible to prevent outward spreading of the legs of the passenger 600 first.

Each of the first cushion 110 and the second cushion 120 may include a plurality of cushions, which are expanded toward the outer sides of the thighs 610 of the passenger 600.

Figure 2:
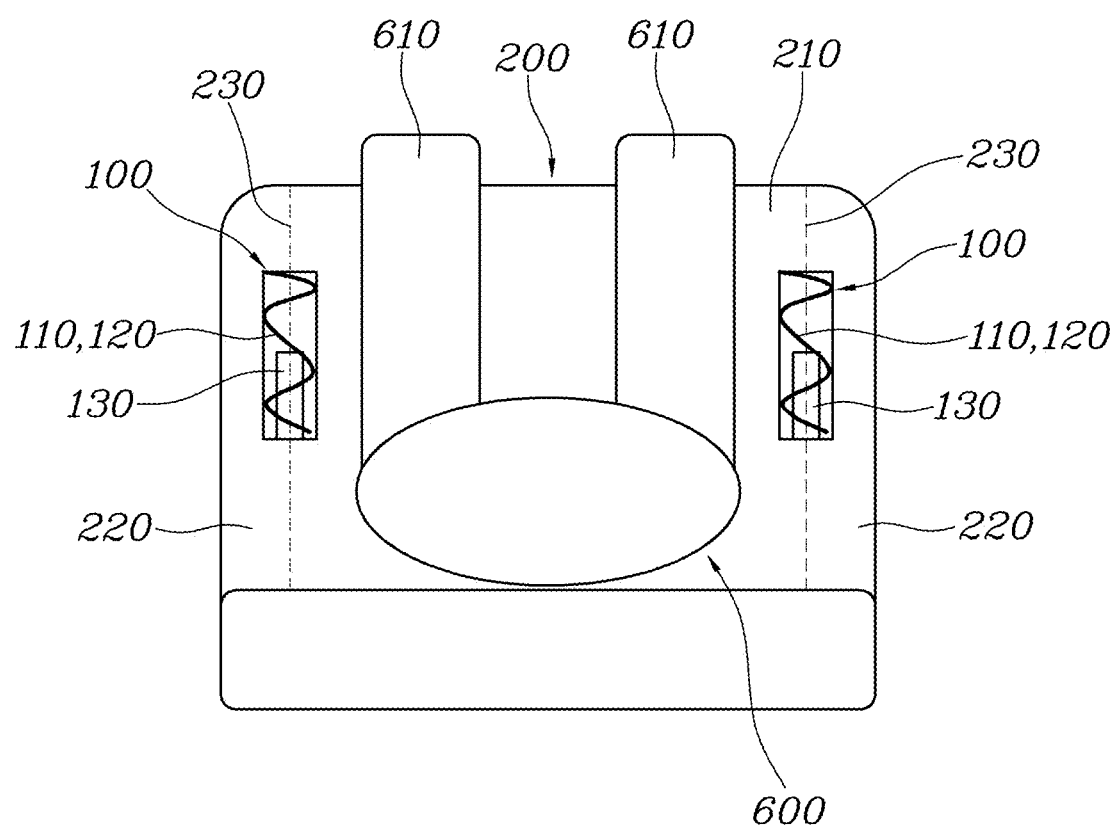
FIG. 2 is a plan view of the vehicular seat cushion airbag according to the embodiment of the present invention before expansion of the airbag.
Figure 3:
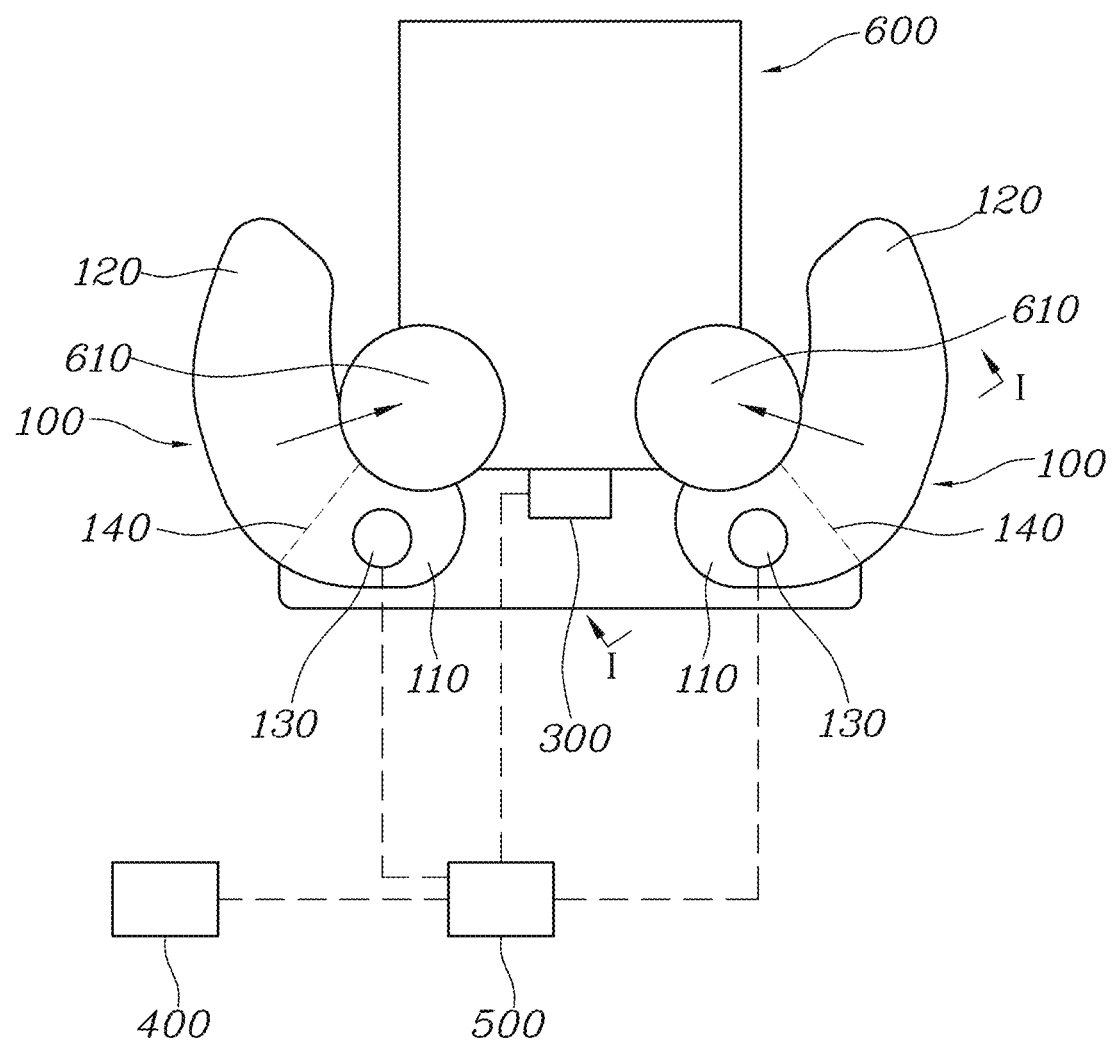
FIG. 3 is a front view of the vehicular seat cushion airbag according to the embodiment of the present invention.
Figure 4:
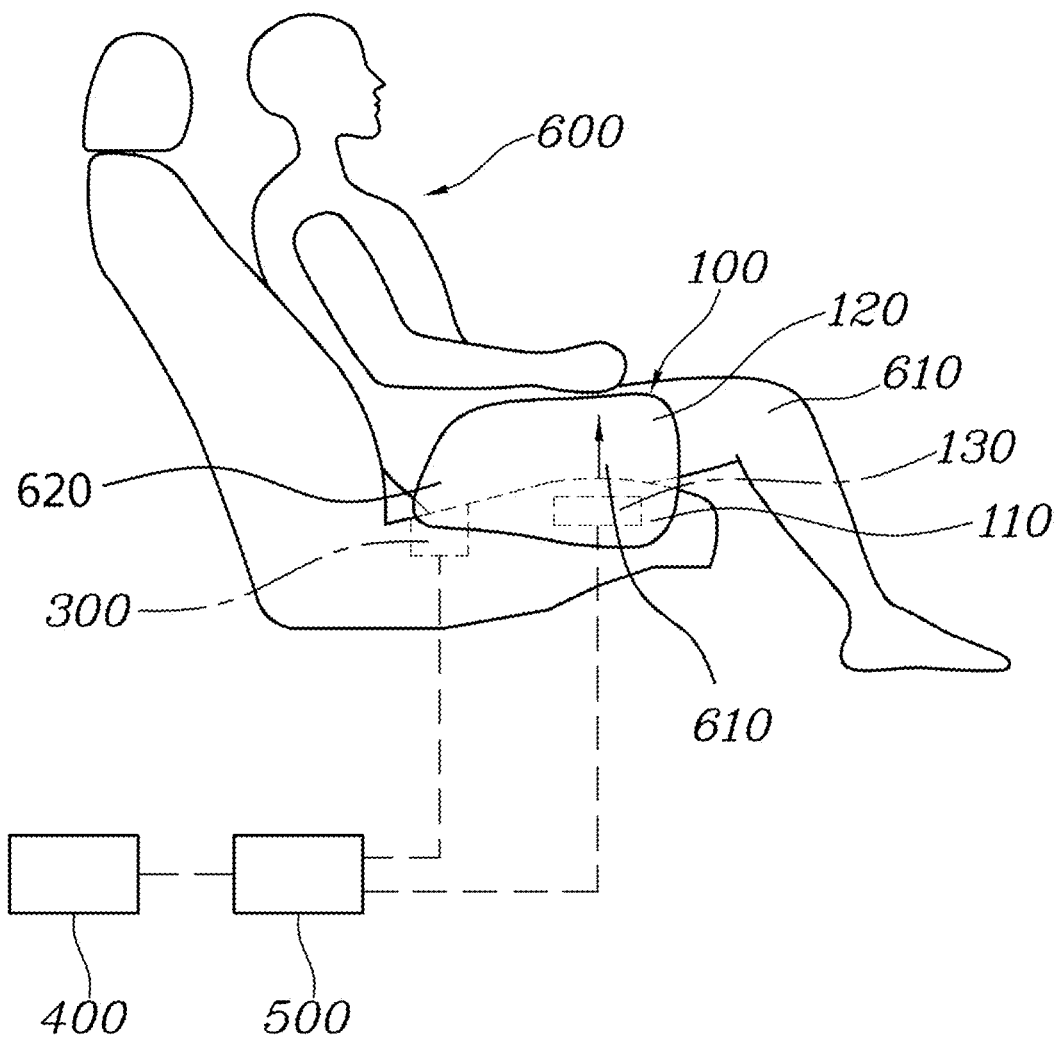
FIG. 4 is a side view of the vehicular seat cushion airbag according to the embodiment of the present invention.
Figure 5:
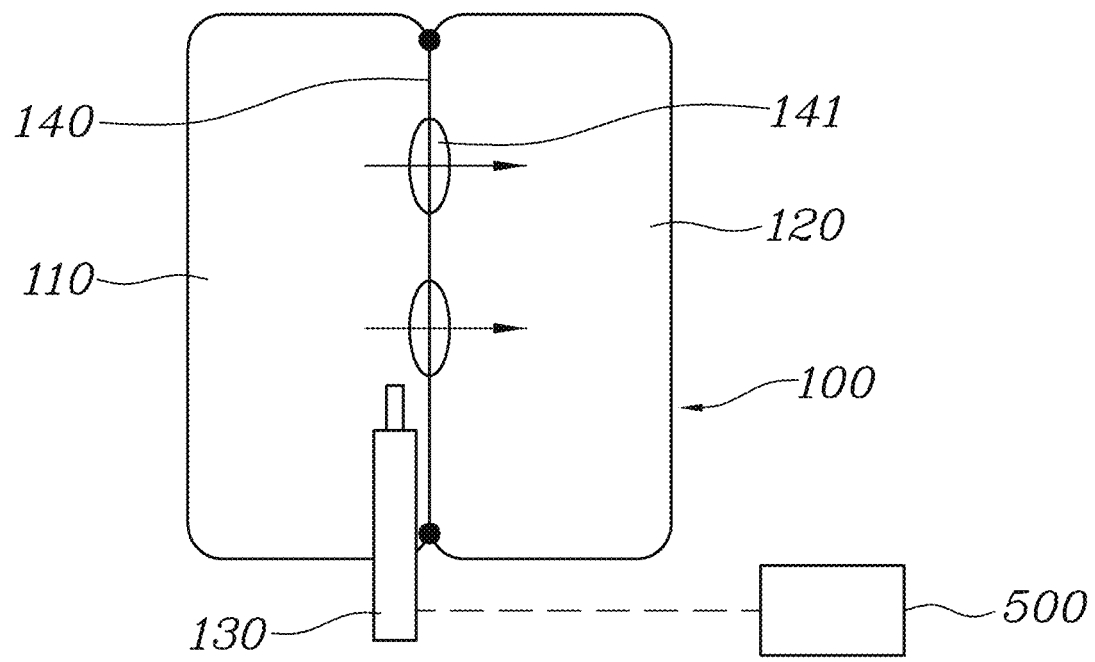
FIG. 5 is a cross-sectional view of the vehicular seat cushion airbag according to the embodiment of the present invention, taken along line I-I in FIG. 3, in which an inflator is connected to a first cushion.
Figure 6:
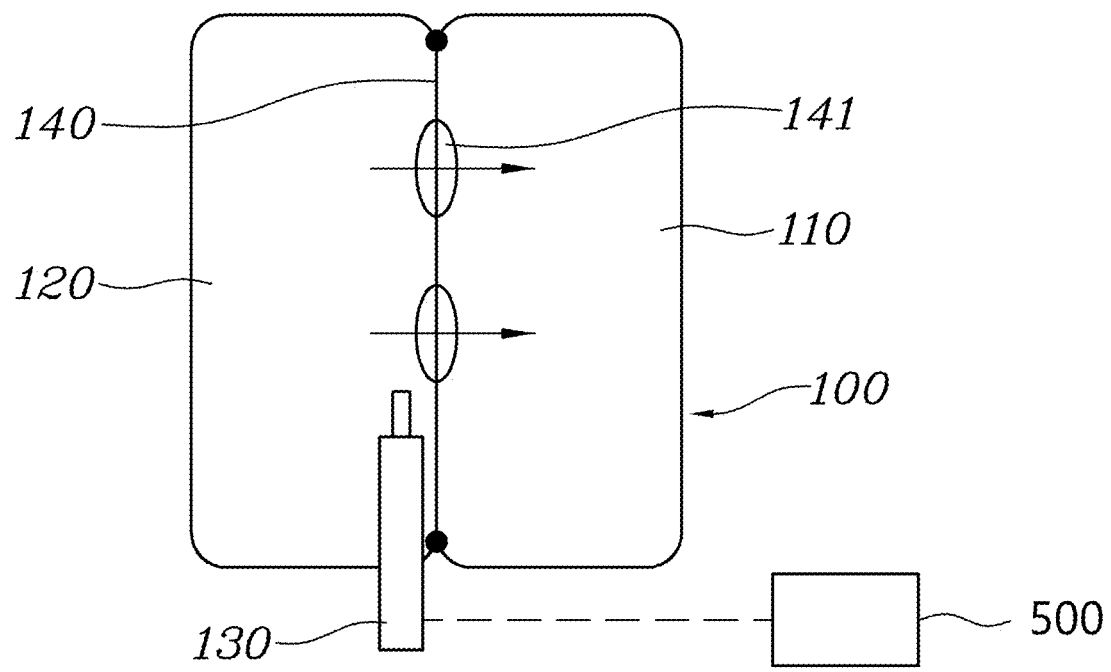
FIG. 6 is a cross-sectional view of the vehicular seat cushion airbag according to the embodiment of the present invention, taken along line I-I in FIG. 3, in which the inflator is connected to a second cushion.
Figure 7:
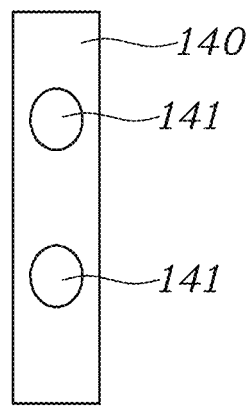
FIG. 7 is a view illustrating a separator of the vehicular seat cushion airbag according to the embodiment of the present invention.
Figure 8:
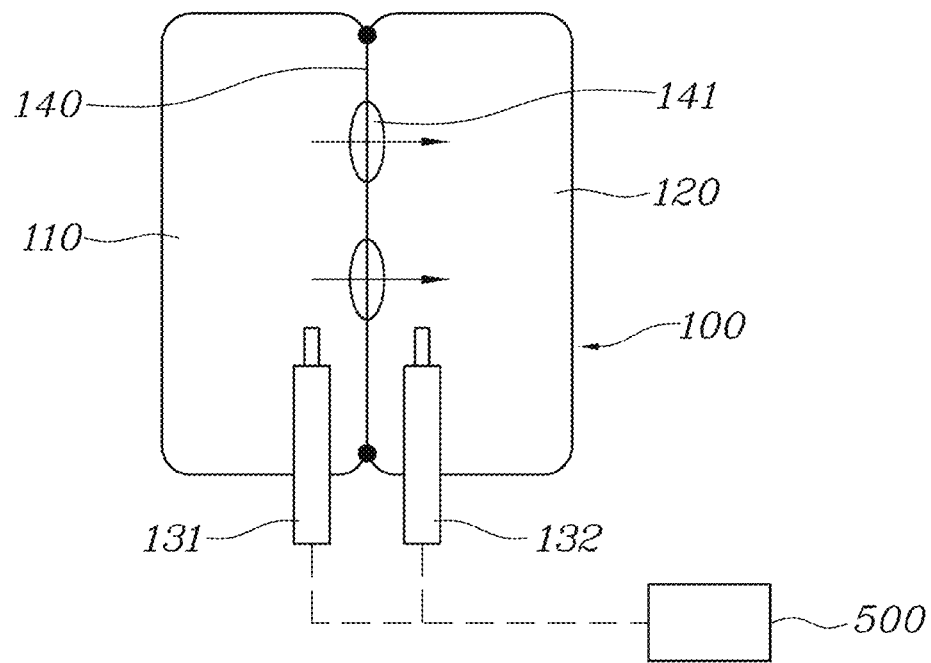
FIG. 8 is a cross-sectional view of the vehicular seat cushion airbag according to the embodiment of the present invention, taken along line I-I in FIG. 3, in which the inflator is composed of a first inflator and a second inflator.

Referring further to FIG. 2, the first cushions 110 and the second cushions 120 may be mounted on two lateral sides of the seat cushion 200 in order to prevent outward spreading of the legs of the passenger 600. The first cushions 110 and the second cushions 120 may be individually or simultaneously expanded through control of the controller 500 if necessary.

Furthermore, only one of two seat cushion airbags mounted on the lateral sides of the seat may be expanded by the controller 500, depending on the kind of collision in which the vehicle is involved.

The first cushion 110 may be expanded at the rear portion of the thigh 610 of the passenger 600 so as to protect the lower portion of the thigh 610 of the passenger 600.

Although an impact may be transmitted to the rear portion of the thigh 610 of the passenger 600 in the event of a collision involving the vehicle, it is possible to protect the rear portion of the thigh 610 of the passenger 600 from injury by expansion of the first cushion 110.

The second cushion 120 may be expanded toward the lateral side surface of the thigh 610 of the passenger 600 so as to cover and protect the lateral side surface of the thigh 610.

Since the second cushion 120 is expanded at the lateral side surface of the thigh 610 of the passenger 600, there are effects not only of preventing outward spreading of the leg of the passenger 600 in the event of a collision involving the vehicle but also of protecting the lateral side surface of the thigh 610 of the passenger 600 from impact in the event of a collision involving the vehicle at the lateral side thereof.

The vehicular seat cushion airbag 100 according to the embodiment of the present invention may include an inflator 130, which is mounted on the seat cushion 200 so as to generate airbag gas at the time of explosion thereof. The inflator 130 may include a first inflator 131, connected to the first cushion 110, and a second inflator 132, connected to the second cushion 120.

The first inflator 131 and the second inflator 132 may be respectively connected to the first cushion 110 and the second cushion 120. The first cushion 110 may expand first when the first inflator 131 explodes, and the second cushion 120 may expand first when the second inflator 132 explodes. Depending on the circumstances, it is possible to prevent forward movement of the pelvis 620 of the passenger 600 first by exploding the first inflator 131, or it is possible to prevent outward spreading of the legs of the passenger 600 by exploding the second inflator 132.

The vehicular seat cushion airbag 100 may include the controller 500, adapted to control the explosion of the first inflator 131 and the second inflator 132. The controller 500 may perform control to explode the first inflator 131 when a front collision signal or a rear collision signal is input thereto from the collision sensor 400.

When a vehicle which is constructed such that passengers 600 sit on seats so as to face each other is involved in a front collision of rear collision, the pelvis 620 of each of the passengers 600 is moved in the forward direction of the seat cushion 200. In order to prevent the forward movement of the pelvis 620, the controller 500 may perform control to first expand the first cushion 110.

When the collision sensor 400 detects a front collision involving the vehicle, the collision sensor 400 transmits a collision signal to the controller 500. The controller performs control to explode the first inflator 131 so as to first expand the first cushion 110 and then to expand the second cushion 120. At this time, since the first cushion 110 is expanded first, there is an effect in which preventing the pelvis 620 of the passenger 600 from moving forwards is performed first.

When the seat sensor 300 detects the state in which no passenger 600 is sitting on the seat, the controller 500 may not perform control to expand the vehicular seat cushion airbag.

The vehicular seat cushion airbag 100 may include the controller 500 adapted to control the explosion of the first inflator 131 and the second inflator 132. When a lateral collision signal from the collision sensor 400 is input, the controller 500 may perform control to explode the second inflator 132.

In the event of a lateral collision involving the vehicle, the legs of the passenger 600 are first spread, and the impact of the collision is applied to the lateral side surface of the thigh 610 of the passenger 600. At this time, the lateral side surface of the thigh 610 of the passenger 600 must be preferentially protected.

Accordingly, when a lateral collision signal is input from the collision sensor 400, the controller 500 may perform control to explode the second inflator 132 so as to expand the second cushion 120 first and then to expand the first inflator 110. Therefore, there is an effect of preventing the legs of the passenger 600 from spreading outwards.

The first cushion 110 and the second cushion 120 may be expanded at a stitch line 220 of the cushion portion 210 of the seat cushion 200.

Since the first cushion 110 and the second cushion 120, which are mounted on the seat cushion 200, are expanded at the stitch line 220 of the seat cushion 200, the first cushion 110 and the second cushion 120 may quickly expand.

The seat cushion 200 may be provided with the cushion portion 210 and a bolster portion 220 depending on the kind of vehicular seat. In a vehicle, which is provided with both the cushion portion 210 and the bolster portion 220, the first cushion 110 and the second cushion 120 may be expanded at the stitch line 220 between the cushion portion 210 and the bolster portion 220. In a vehicle not provided with the bolster portion 220, the first cushion 110 and the second cushion 120 may be expanded at the stitch line 220, which is formed at the time of manufacturing the vehicular seat.

In the event of a collision involving the vehicle, the first cushion 110 may expand first under the thigh 610 of the passenger 600 so as to prevent forward movement of the pelvis 620 of the passenger 600. At the same time, the second cushion 120 may be expanded upwards from the first cushion 110 so as to be positioned at the lateral side surface of the thigh 610 of the passenger 60.

As is apparent from the above description, the vehicular seat cushion airbag 100 according to the embodiment of the present invention may be composed of the first cushion 110 and the second cushion 120, and may be mounted on the seat cushion 200 of the vehicle. In the event of a collision involving the vehicle, the first cushion 110 may be expanded at the rear portion of the thigh 610 of the passenger 600 so as to prevent forward movement of the pelvis 620 of the passenger 600, and the second cushion 120 may be expanded upwards from the first cushion 110 so as to prevent outward spreading of the legs of the passenger 600, thereby offering advantages of preventing the submarine phenomenon and injuries caused by the submarine phenomenon.

Furthermore, since the second cushion 120 may be expanded so as to surround the lateral side surface of the thigh 610 of the passenger 600 in the event of a collision involving the vehicle, there is an advantage of preventing injuries of the passenger 600 caused by collision of the legs of the passenger 600 with legs of another passenger or with interior components of the vehicle.

In addition, since the first cushion 110 may be expanded at the rear portion of the thigh 610 of the passenger 600 while the second cushion 120 may be expanded at the lateral side surface of the thigh 610 of the passenger 600 in the event of a collision involving the vehicle, there is an advantage of protecting the thigh 610 from the impact of the collision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicular seat cushion airbag comprising:
   a first cushion mounted on a seat cushion of a vehicle so as to be expanded upwards from the seat cushion to prevent forward movement of a passenger's pelvis;
   a second cushion, which is positioned at an outer side of the first cushion and is expanded in an upward direction of the first cushion;
   a first inflator, which is mounted on the seat cushion and generates airbag gas to be supplied to an inside of the first or second cushion; and
   a separator, which is disposed between the first and second cushions and includes a plurality of vent holes, wherein the first and second cushion communicate with each other through the plurality of vent holes, and the airbag gas flows from one of the first and second cushions to a remaining one of the first and second cushions through the plurality of vent holes.

2. The vehicular seat cushion airbag according to claim 1, wherein the first inflator is connected to the first cushion such that the first cushion is first expanded at a time of explosion of the first inflator and the airbag gas then flows to the second cushion from the first cushion through the plurality of vent holes so as to expand the second cushion.

3. The vehicular seat cushion airbag according to claim 1, wherein the first inflator is connected to the second cushion such that the second cushion is first expanded at a time of explosion of the first inflator and the airbag gas then flows to the first cushion from the second cushion through the plurality of vent holes so as to expand the first cushion.

4. A vehicular seat cushion airbag comprising:
a first cushion mounted on a seat cushion of a vehicle so as to be expanded upwards;
a second cushion, which is positioned at an outer side of the first cushion and is expanded in an upward direction of the first cushion;
a first inflator, which is mounted on the seat cushion and generates airbag gas to be supplied to an inside of the first or second cushion, wherein the second cushion is configured to be expanded toward a lateral side surface of a thigh of a passenger; and
a separator, which is disposed between the first and second cushions and includes a plurality of vent holes, wherein the first and second cushion communicate with each other through the plurality of vent holes, and the airbag gas flows from one of the first and second cushions to a remaining one of the first and second cushions through the plurality of vent holes.

5. A vehicular seat cushion airbag comprising:
a first cushion mounted on a seat cushion of a vehicle so as to be expanded upwards;
a second cushion, which is positioned at an outer side of the first cushion and is expanded in an upward direction of the first cushion;
a first inflator, which is mounted on the seat cushion and generates airbag gas to be supplied to an inside of the first or second cushion, wherein each of the first and second cushions is composed of a pair of cushions, which are symmetrically mounted on two lateral sides of the seat cushion configured to be expanded toward two lateral side surfaces of thighs of a passenger; and
a separator, which is disposed between the first and second cushions and includes a plurality of vent holes, wherein the first and second cushion communicate with each other through the plurality of vent holes, and the airbag gas flows from one of the first and second cushions to a remaining one of the first and second cushions through the plurality of vent holes.

6. The vehicular seat cushion airbag according to claim 1, wherein the first and second cushions are expanded so as to surround a thigh of a passenger.

7. The vehicular seat cushion airbag according to claim 1, further comprising a second inflator, which is mounted on the seat cushion and generates airbag gas at a time of explosion thereof,
wherein the first inflator is connected to the first cushion, and the second inflator is connected to the second cushion.

8. The vehicular seat cushion airbag according to claim 7, further comprising a controller adapted to perform control of explosion of the first and second inflators,
wherein the controller performs control to explode the first inflator when a front collision signal or a rear collision signal is input from a collision sensor.

9. The vehicular seat cushion airbag according to claim 7, further comprising a controller adapted to perform control of explosion of the first and second inflators,
wherein the controller performs control to explode the second inflator when a lateral collision signal is input from a collision sensor.

10. The vehicular seat cushion airbag according to claim 1, wherein the first and second cushions are expanded at a stitch line of the seat cushion.

* * * * *